United States Patent [19]

van Wijngaarden

[11] 4,416,450
[45] Nov. 22, 1983

[54] LETTER CONVEYOR SWITCH DRIVE

[75] Inventor: Hans van Wijngaarden, Leidschendam, Netherlands

[73] Assignee: Staat der Nederlanden (Staatsbedrijf der Posterijen, Telegrafie en Telefonie), The Hague, Netherlands

[21] Appl. No.: 276,022

[22] Filed: Jun. 22, 1981

[30] Foreign Application Priority Data

Jul. 2, 1980 [NL] Netherlands ................. 8003834

[51] Int. Cl.³ .......................................... B65H 29/60
[52] U.S. Cl. ................................... 271/303; 198/367; 209/657
[58] Field of Search ............... 271/303, 305, 302, 297; 209/657, 656; 198/367, 442

[56] References Cited

U.S. PATENT DOCUMENTS 3,347,367 10/1967 Smith ........................... 271/305 X
4,222,557 9/1980 Wu ................................... 271/4
4,251,000 2/1981 Templeton ................... 271/303 X Primary Examiner—Bruce H. Stoner, Jr.
Attorney, Agent, or Firm—Hugh Adam Kirk

[57] ABSTRACT

Switching device arranged to control the movement of postal items into one or other of two alternative directions, comprising a switch tongue (4) which is capable of pivoting between two fixed stops and which can be driven via a slipping clutch (11) by an electro-motor (10) having a very small mass moment of inertia and a very large starting couple.

1 Claim, 2 Drawing Figures

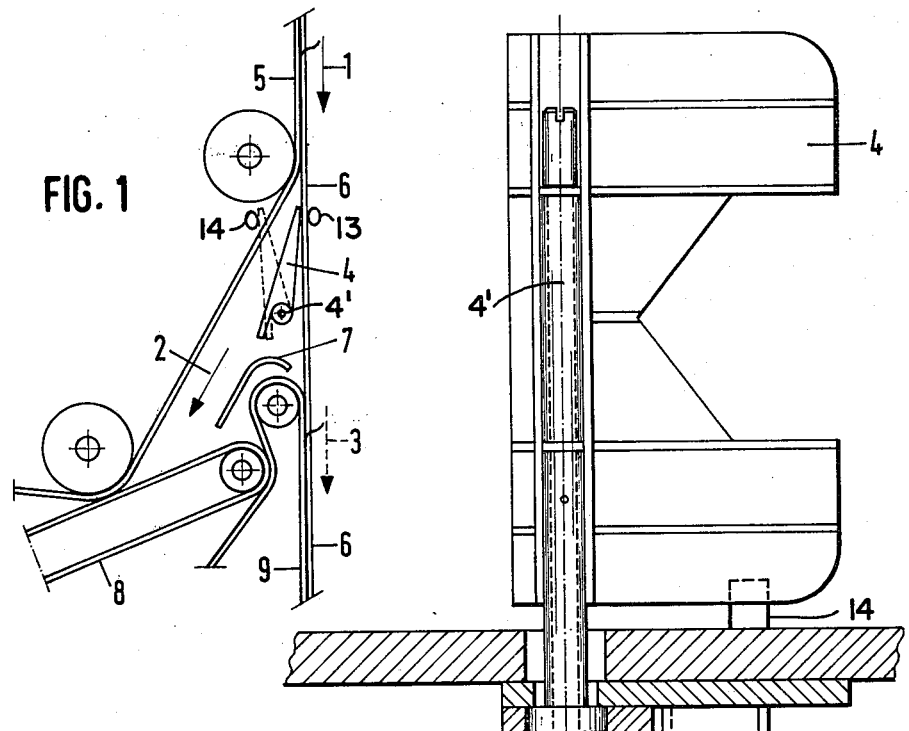
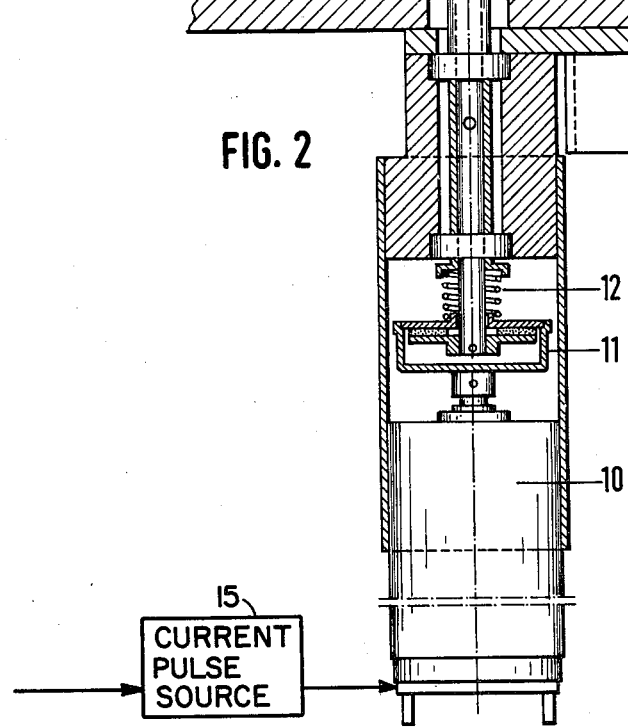

LETTER CONVEYOR SWITCH DRIVE

BACKGROUND OF THE INVENTION

The invention relates to a switching device arranged to control the movement of postal items into one or other of two alternative directions, comprising a switch tongue, which is capable of pivoting between two fixed stops, and electromagnetic driving means.

Such switching devices are generally known. It is usual to drive switching devices by means of one or two electro-magnets. The increasing handling speed of postal items requires very rapid switching devices, which, however, exhibit bouncing of the switch tongue as soon as a stop is reached. The switch tongue, thus leaving its outermost position again, may block the flow of postal items.

Another problem consists in designing the switch drive such that in the two directions the change-over times of the switch are equal. That is why the minimum space between postal items always has to be adjusted to the longest change-over time.

SUMMARY OF THE INVENTION

The invention provides a solution for above mentioned problems. This solution comprises a switch torque driving means having an electro-motor and a slipping clutch between the electro-motor and the switch tongue. The motor can be excited by a current pulse which is prolonged for a short time after a stop has been reached. The motor has preferably a small mass moment of inertia and a large starting couple. The coupling between motor and switch tongue slips when the motor slows down, to hold the switch tongue against its stop.

These features allow a very rapid operation of the switch without any bouncing of the switch tongue.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 1 is a schematic plan view of parts of a plurality of belt letter conveyors at a switch tongue, which tongue is shown in dashed lines in its other position, and FIG. 2 is an enlarged vertical side view partly in section of the switch tongue shown in FIG. 1 and its driving means.

DETAILED DESCRIPTION OF A PREFERRED EMBODIMENT

FIG. 1 shows the switch tongue in a transport system for letters.

A letter moving in the direction indicated—with some parallel displacement—by arrow 1 can be routed by means of the switch tongue 4 to an outlet indicated by arrow 2 or to an outlet indicated—with some parallel displacement—by arrow 3. In the tongue full line position shown, it will move along arrow 2. The letter, which arrives pinched between two conveyor-belts 5 and 6, is led between the conveyor-belt 5 and, successively, the switch tongue 4, a guide 7 and a conveyor-belt 8. In the alternative tongue position—indicated in dash lines - the letter is led between belt 6 and, successively, tongue 4, guide 7 and a belt 9.

FIG. 2 shows an embodiment of the switch tongue and a drive according to the invention.

The switch tongue 4 is pivoted to a shaft 4' at its downstream end, which shaft 4' is driven by a rotary motor 10. In the embodiment shown, motor 10 drives tongue 4 between two fixed stops 13 and 14 via a slipping clutch 11 between the shaft 4' and the motor 10, which clutch 11 is provided with a compression spring 12. Motor 10 must have so low a mass moment of inertia and so high a starting couple that the switch tongue 4 can be changed over in the time which is available when the interval or space between two successive postal items passes.

The switch tongue 4 must have so low a mass moment of inertia and the clutch 11 must be so designed that no slip occurs when motor 10 starts.

The motor is driven by a current pulse from a current source 15, which pulse must preferably have stopped at the moment when the letter has entirely passed the switch tongue 4, so that the complete starting couple is available for a possible immediately-following change-over.

While there is described above the principles of this invention in connection with specific apparatus, it is to be clearly understood that this description is made only by way of example and not as a limitation to the scope of this invention.

I claim:

1. A switching device for a letter-type conveyor having driven belts between which belts letters are conveyed one after the other from one direction to one of two alternate directions, said switching device comprising:
   (A) a low momentum fast-acting switching tongue pivoted downstream on a shaft for oscillation between two stop positions for directing letters in one of said two alternate directions,
   (B) a spring-urged friction clutch mounted on said shaft,
   (C) a reversible low-momentum high torque electric rotary motor axially of said shaft and driving said clutch, and
   (D) a source of a short driving current pulse for said motor having a duration slightly longer than the time to move said tongue between its two stop positions, whereby said clutch will not slip on starting of said motor, but will slip and not bounce when said tongue is urged in one of its two stop positions.

* * * * *